March 30, 1965
T. R. CARRELL
3,175,832
SEALING GASKET
Filed April 26, 1963
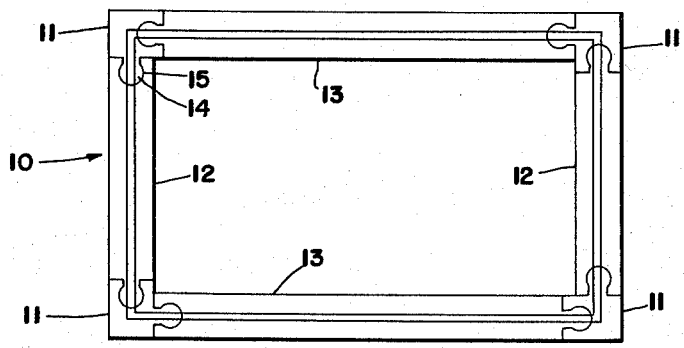
Fig. 1
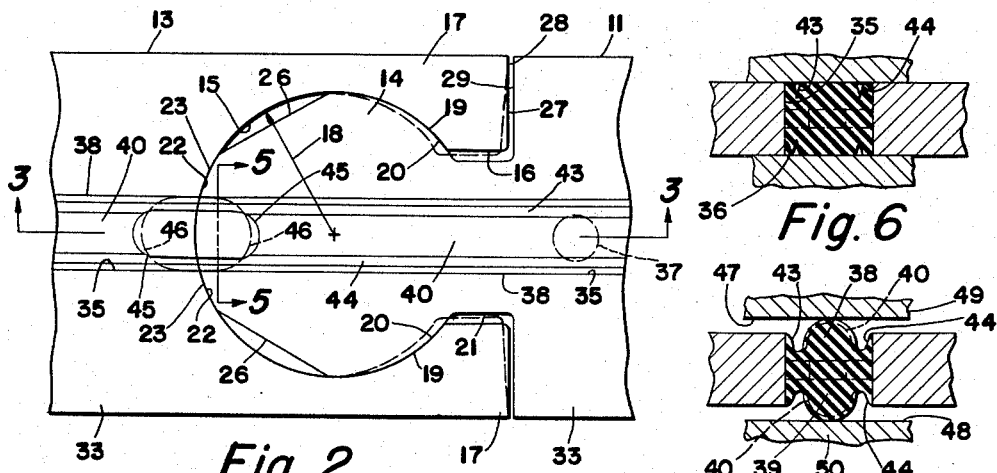
Fig. 2    Fig. 6    Fig. 5
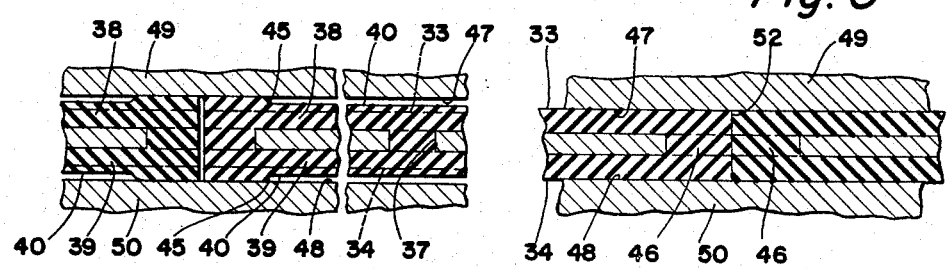
Fig. 3    Fig. 4
INVENTOR.
THEODORE R. CARRELL
BY
ATTORNEY United States Patent Office 3,175,832
Patented Mar. 30, 1965

3,175,832
SEALING GASKET
Theodore R. Carrell, Los Angeles, Calif., assignor to Parker-Hannifin Corporation, Cleveland, Ohio, a corporation of Ohio
Filed Apr. 26, 1963, Ser. No. 275,990
17 Claims. (Cl. 277—199)

This invention relates to sealing gaskets and more particularly to sectional gaskets for sealing the joint between a pair of fluid carrying members in which several gasket sections of metal or other rigid material, and each carrying a resilient or rubber like sealing strip, are joined together for making a complete gasket.

In sectional gaskets of this type it is necessary that the resilient strip in each section tightly contact the resilient strip of the adjacent sections so as to provide continuous sealing contact with the members being sealed. Also, it is necessary that the resilient material initially project from the face of the metallic or rigid portion of the sections in order to assume sealing contact with the members, the projecting resilient material being deformable to the level of the metallic portion when the gasket is tightly clamped between the members and the metallic portion serving as a stop or spacer for carrying the clamping load and for retaining the resilient sealing strip to support the same against blowout by fluid pressure.

It is an object of the present invention to provide a sectional gasket of the type described in which the resilient sealing strip in each gasket section is specially shaped where it abuts the sealing strip of an adjacent section to assure that the abutting sealing strips will be in tight end to end contact for preventing leakage of fluid therebetween.

It is another object to provide a sectional gasket with resilient sealing strips in which the sections are joined by interlocking portions capable of limited pivoting movement relative to each other and in which the abutting sealing strips in the interlocked portions accommodate such pivoting movement without losing sealing contact with each other.

It is another object to provide a sectional gasket comprising interlocked metallic sections each carrying a resilient sealing strip in a groove, the strip initially projecting from the groove and being deformable so as to be completely contained within the groove, in cross section the strip having an area just slightly less than the area of the groove except that where the strips abut an adjacent strip the cross section area of the strip is substantially the same as the cross section area of the groove so that these portions of the strips will be deformed tightly against the abutting strip when the gasket is clamped into place.

It is another object to provide a sectional gasket as described in which the metallic portion is grooved on opposite sides with spaced holes connecting the grooves, and there is a resilient sealing strip in each groove with resilient material in the holes integrally connecting the strips, each strip having an enlarged portion adjacent the joint between sections of greater cross sectional area than the remainder of the strip, and the metallic portion having a slot or hole between the grooves and adjacent the joint, the slot being of optimum dimension for facilitating deformation of the enlarged strip portion without loss of sealing ability.

It is another object to provide a sectional gasket of the type described in which the interlocked metallic portions provide a spring action for maintaining a tight joint where the sealing strips of adjacent sections meet.

Other objects will be apparent from the following descriptions and from the drawings in which:

FIG. 1 is a plan view of a complete gasket formed from interlocked gasket sections, FIG. 2 is an enlarged view of the joint between gasket sections.

FIG. 3 is a section view along the lines 3—3 of FIG. 2 showing the gasket sections between the members to be sealed and in an initial condition before clamping pressure from the members and interlocking pressure from the metallic portion of the gasket sections is applied.

FIG. 4 is a view corresponding to FIG. 3 after clamping and interlocking pressure has been applied.

FIG. 5 is a cross section along the lines 5—5 of FIG. 2 before clamping pressure is applied.

FIG. 6 is a cross section corresponding to FIG. 5 after clamping pressure has been applied.

As shown in FIG. 1, a complete gasket 10 is made up of a series of interlocked sections comprising corner pieces 11 and straight or run pieces 12 and 13. Each of the sections has a tongue 14 and a recess 15 for interlocking engagement with the recess and tongue of adjacent sections.

Each recess 15 has an opening 16 to form prongs 17 and is circular on a radius 18 when interlocked with a tongue 14 but initially prongs 17 project inwardly to the dotted positions as shown for a purpose later described. Each tongue 14 has rear edges 19 on a like radius 18 for engaging the rear faces 20 of prongs 17 with pressure contact and also has a neck 21 of slightly narrower width than opening 16 to permit slight pivoting of the tongue within the recess about the center of radius 18.

Each tongue 14 has front edge portions 23 formed on radius 18 and engageable with front edges 22 of recess 15. The tongue is relieved with slight bias cuts 26 which preferably extend from front edges 23 to a transverse center-line through the center point of radius 18.

There is also a clearance 27 between opposed transverse faces 28, 29 of the gasket sections to further facilitate relative pivoting motion of the sections.

Each of the corner pieces 11 and straight sections 12, 13 has opposed flat faces 33, 34 with grooves 35, 36 therein, the grooves being connected at spaced intervals by holes 37. Respectively located within grooves 35, 36 are sealing strips 38, 39, each of which has a rib 40 which initially projects beyond the corresponding flat faces 33, 34 and which has channels 43, 44 within the confines of grooves 35, 36. Throughout the greater part of its length each strip 38, 39 has a cross section area approximately 95% of the cross section area of the respective groove 35, 36 the cross section area of the projecting portion of rib 40 being very nearly the combined cross section areas of the respective channels 43, 44.

Adjacent its ends, each sealing strip has its rib 40 slightly enlarged in both vertical and transverse directions, such enlarged portions being indicated at 45. The cross section areas of the enlarged portions 45 are initially slightly greater than the cross section areas of grooves 35, 36 to make up for any loss of sealing strip volume in this area by shrinkage, edges rounded by flash removal methods after molding, etc. so that when the parts are assembled and the sealing strips compressed, each enlarged portion 45 will fill from 95 to 100% of its groove in this area.

Between the enlarged rib portions 45 in each groove 35, 36 is a slot 46 which extends from a point a few thousands of an inch from the free end of the tongue 14, or recess edge as the case may be, back a distance equal to about two thirds of the width of grooves 35, 36. Slots 46 are preferably on a radius equal to one half the width of grooves 35, 36 with the tangent point of the radius with the edges of the slots being spaced from the edge of the tongue (or recess) so that slots 46 are the full width of grooves 35, 36 for a distance back of the tongue or recess edge. It has been found that if slot 46 is significantly shorter or narrower than described, the sealing strips in this region may not deform properly and may overflow their grooves 35 or 36, whereas if slot 46 is materially longer than described the strips deflect sideways too easily and may not properly align themselves with the abutting sealing strip. Thus, for example, when grooves 35, 36 are of .156" width, slots 46 may be between .100" and .140".

In use the gasket sections are interlocked as shown and the gasket is then placed between flat faces 47, 48 of members 49, 50 to be sealed. When the parts are interlocked, each enlarged end 45 of strips 38, 39, are held in near engagement with the enlarged ends 45 of the adjacent strips 38, 39 by pressure contact of prongs 17 with rear edges 19 of the tongues. In making such contact, prongs 17 spring out from the dotted to the full line position shown in FIG. 2 and thus provide a spring action for holding front edges 23 of the tongue in metal to metal contact with the opposed edges 22 of recess 15, as shown in FIG. 4. This eliminates any gap between edges 22, 23 into which the sealing strip might otherwise be forced. Bias cuts 26 provide clearance with the opposed portions of the recess to assure such metal to metal contact of edges 23 with the recess edge in the event the tongues or recesses are slightly out of round or off dimension due to manufacturing imperfections.

As members 49, 50 are brought into clamping contact with faces 33, 34 of metallic sections 11, 12, 13, ribs 40 establish sealing contact with the members and are deformed to a position within grooves 35, 36, as shown in FIG. 6, with channels 43, 44 being substantially filled with displaced or deformed material from ribs 40. At the same time enlarged rib portions 45 are also deformed to a position within grooves 35, 36, any strip material in excess of the volume of the grooves and slot 46 in this region being either compressed into the volume of the grooves or displaced rearwardly to fill channels 43, 44 for a short distance behind enlarged rib portions 45. Also, the ends of strips 38, 39 come together, as shown at 52 in FIG. 4.

With the additional volume of resilient material provided by rib enlargements 45, full contact along the abutting ends of the strips and along the surfaces 47, 48 is assured despite tolerance variations and despite slight axial misalignment of the parts.

Although only one form of the invention has been illustrated and described, it is intended that the following claims encompass other modifications equivalent thereto.

I claim:

1. In a sectional gasket a first section having a recess, a second section having a tongue for interlocking engagement with said recess, said first section having a groove with a first resilient sealing strip therein extending to the edge of said recess, the second section having a groove in said tongue with a second resilient sealing strip therein arranged to butt against the first sealing strip when the tongue is in said recess, at least one of said strips having an enlarged cross sectional area where it butts against the other strip.

2. The gasket of claim 1 in which there is an enlarged cross sectional area on both sealing strips where they butt each other.

3. The gasket of claim 1 in which the enlarged cross sectional area is substantially the same as the cross sectional area of the groove in the region of the enlargement.

4. The gasket of claim 1 in which the cross sectional area of the enlarged cross section is from 95% to 105% of the cross sectional area of the groove in the region of the enlargement.

5. The gasket of claim 1 in which each of the sections has an additional groove opposite the first and second grooves respectively, and there are abutting additional resilient sealing strips in the additional grooves, and at least one of the additional strips has an enlarged cross section area where it butts against the other additional strip.

6. In a sectional gasket, a first section having a recess, a second section having a tongue for interlocking engagement with said recess, said first section having a groove with a first sealing strip therein extending to the edge of the recess, the second section having a groove in said tongue with a second resilient sealing strip therein arranged to butt against the first sealing strip when the tongue is in said recess, each of said strips having a rib extending lengthwise thereof with a first portion thereof initially projecting from said groove so as to be engageable by a part to be sealed, at least one of said strips having a second rib portion where the sealing strips butt and projecting a greater distance from said groove than the first portion, said strips having channel means within the grooves adjacent the first and second rib portions into which the ribs may be deformed by contact with a part to be sealed.

7. The gasket of claim 6 in which the channel means adjacent said first rib portions has a cross section area slightly greater than that of the projecting part of the first rib portions and the channel means adjacent the second rib portion has a cross sectional area substantially the same as that of the second rib portion.

8. The gasket of claim 6 in which the second rib portion is of greater width than the first rib portion.

9. The gasket of claim 6 in which each strip has a second rib portion and each second rib portion extends beyond the edge of the respective section.

10. In a sectional gasket, a first section having a recess, a groove intersecting the recess, a first resilient sealing strip in the groove, and front edges next to said strip, a second section having a tongue receivable in said recess and having a groove with a second sealing strip therein, said strips being arranged to butt each other when the tongue is within the recess, said tongue having front edges adjacent the strip therein adapted to contact said front edges of said recess, portions of the walls of said recess having an initial interference fit with rear edges of said tongue and being sprung when the tongue is received within the recess so as to apply pressure to said rear edges for holding the front edges of said tongue in contact with the front edges of said recess.

11. The gasket of claim 10 in which said tongue and recess are so formed as to have a clearance adjacent said contacting edges.

12. In a sectional gasket, a first section having opposed grooves on opposite faces thereof intersecting a recess and with a sealing strip of resilient material in each groove, a second section having a tongue for interlocking engagement with the recess and having opposed grooves on opposite faces thereof with sealing strips of resilient material therein arranged to butt against the sealing strips in said first section when the tongue and recess are interlocked, the strips in one section having enlarged portions where they butt the strips of the other section, each section having a slot therein connecting the opposed grooves of such section in the region where the strips butt, and resilient material in said slots integrally connecting the strips in opposed grooves of each section.

13. The gasket of claim 12 in which the slots are the full width of the grooves.

14. The gasket of claim 12 in which the slots intersect the edge of the respective tongue or recess and at such intersection are the full width of the grooves.

15. The gasket of claim 13 in which the slots extend along the grooves a distance more than one half the width of the grooves.

16. The gasket of claim 13 in which the slots extend along the grooves a distance no more than the width of the groove and no less than one half of such width.

17. The gasket of claim 12 in which all of the sealing strips have portions extending therealong of enlarged cross section where they butt and said slots extend substantially the same distance as said enlarged portions.

References Cited by the Examiner

UNITED STATES PATENTS

| | | | |
|---|---|---|---|
| 1,986,465 | 1/35 | Dempsey | 277—199 |
| 2,513,178 | 6/50 | Jackson | 277—180 X |
| 2,717,793 | 9/55 | Nenzell | 277—180 |
| 2,851,317 | 9/58 | Greitenstein | 277—139 |

FOREIGN PATENTS 15,077   9/93   Great Britain.

EDWARD V. BENHAM, *Primary Examiner.*